Nov. 13, 1951     B. R. WEBSTER     2,574,992
REEL
Filed Jan. 21, 1948
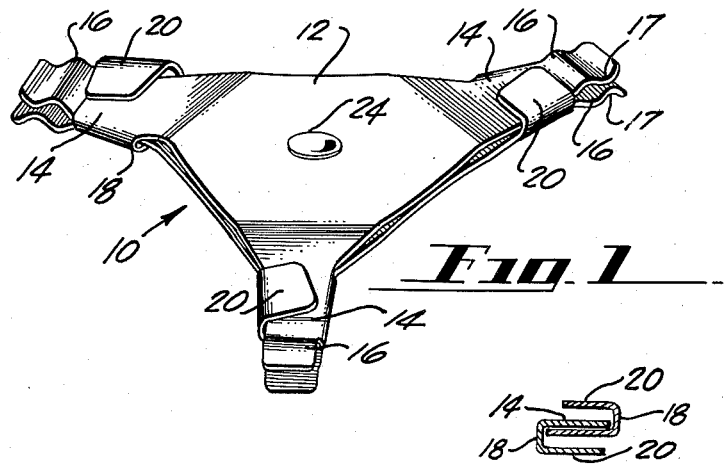
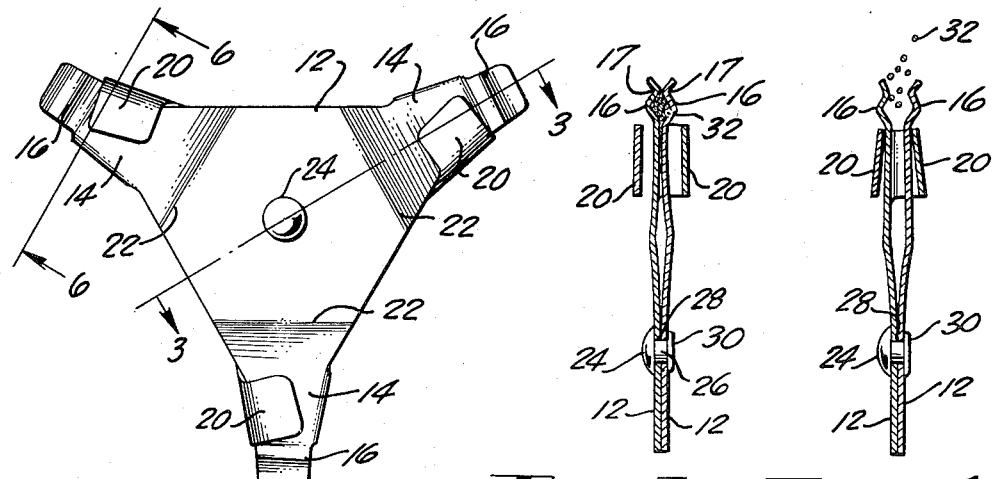
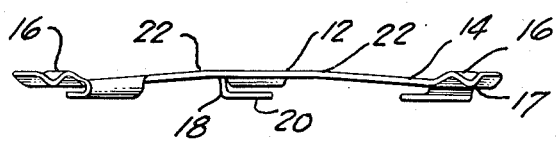
INVENTOR.
BENJAMIN R. WEBSTER
BY
Edwin Coates
ATTORNEY Patented Nov. 13, 1951

2,574,992

UNITED STATES PATENT OFFICE 2,574,992

REEL

Benjamin R. Webster, Santa Monica, Calif.

Application January 21, 1948, Serial No. 3,499

3 Claims. (Cl. 242—96)

The present invention relates to a reel for holding a coil of filamentary material, and is primarily directed to such a device for holding a coil of fishing line leader.

Leaders of nylon or similar material for use in fly fishing are generally purchased in short lengths which are coiled and packaged in small paper envelopes or the like. Once the envelope is opened, replacement of the leader therein is rather unsatisfactory because the material of the line is resilient and tends to straighten out in use and resist a return to coiled condition. Winding the line on a stick or the like is equally unsatisfactory because it will unwind as soon as released.

The present invention provides a novel and convenient solution to this problem in the form of a reel having a plurality of spring biased clamping members which may be actuated to instantly receive or release a coil of line. Essentially, the device comprises a pair of plates of resilient material, each provided with several radially extending legs having clamping portions to their ends. The plates are fastened together so that pairs of legs on the respective plates overlie each other and the clamping portions are in resilient contact with each other.

Tabs on each of the legs extend to the rear of the mating legs and, when they are grasped and squeezed together, the clamping portions are spread apart to receive or release the coil. The resilient pressure is such that the coil may be snapped in and out without the use of the tabs but it is preferable to use them in order to avoid any possibility of abrasion of the line.

After a line has been used it may be wrapped around the fingers to form a coil of suitable size and the coil may then be inserted in the clamp members one at a time. The reel may then be placed in a tackle box with other reels with no likelihood of entanglement and is instantly available when required.

Additional advantages and features of novelty will become apparent as the description proceeds. While the invention may take various constructional forms, the presently preferred embodiment is illustrated in the accompanying drawing in which:

Figure 1 is a perspective view of the reel;

Figure 2 is a plan view thereof;

Figure 3 is a sectional view taken on line 3—3 of Figure 2 showing the jaws closed and embracing the strands of a coil;

Figure 4 is a view similar to Figure 3, but showing the jaws moved to open position and the strands of the coil leaving the mouth of the clamp;

Figure 5 is an edge view of one of the pair of plates forming the reel; and

Figure 6 is a sectional view taken on line 6—6 of Figure 2.

The general construction and arrangement of parts of the preferred embodiment are shown in Figure 1, in which the spider-like body 10 is composed of two identical plates 12 of resilient material such as stainless steel or spring brass sheet, which are generally triangular in form altho any other desired shape may be adopted. A short extension or leg 14 extends radially outwardly from each apex of each triangular plate and terminates in a clamp portion or jaw 16 formed by reversely bending the material of the free end of each leg, a pair of jaws thus formed providing between them a generally cylindrical passage for the reception of the strands of a coil of line.

Each leg is further provided with a tab which extends a short distance out of the plane of the plate, as at 18, and thence laterally in a plane more or less parallel to the plane of the plate, as at 20 for a purpose to be later described. Each plate is slightly dished by bending at 22 as best illustrated in Figure 5, and the pair of plates is assembled with the concave surfaces facing each other and with the legs 14 of the respective spiders overlying each other to provide pairs carrying cooperating clamping jaws. The plates are attached together by means of a rivet having a head 24 and a shank 26 passing thru matching apertures 28 in the plates and headed over at 30. It will be understood, of course, that any known attaching means may be used such as bolts, spot welds, and the like. The thickness of the plates has been exaggerated for clarity of illustration, the actual thickness being only a few thousandths of an inch.

Because of the dishing of the plates previously mentioned the parts 17 of the jaws 16 will come into contact first upon assembly, and continued approach of the center portions of the plates toward each other will produce a spring bias resiliently holding the jaws in engagement. The riveting operation then completes the permanent assembly of the parts with the tab 20 of each leg lying spaced a short distance behind the mating leg 14 of the pair as clearly brought out in Fig. 6. If the dishing of one plate is great enough the other plate may be left flat, but it is preferable to make all plates identical to simplify the manufacturing operation.

It will be seen from Figure 3 that the jaws 16 in closed position provide a generally cylindrical passage which retains the strands 32 of a coil against accidental displacement. When a pair of tabs 20 is grasped between the thumb and forefinger and squeezed together the jaws 16 are separated against the spring bias and the strands 32 are released for removal from the reel. As the jaws separate, the legs 14 come into contact with the tabs 20 and the extent of separation is accordingly limited.

The invention described herein provides a simple and eminently satisfactory means for storing fishing line leaders or similar articles without danger of entanglement, which is easy to operate and will not readily get out of order. It will be apparent to those skilled in the art that various changes and modifications may be made therein without departing from the spirit of the invention and it is intended that all such changes and modifications shall be embraced within the scope of the following claims.

I claim:

1. A reel for a coil of filamentary material comprising: a pair of dished plates of resilient material having their concave surfaces facing each other; means to hold the center portions of said plates substantially in contact with each other; a plurality of legs extending radially outwardly of each plate, the legs of one plate overlying the legs of the other plate; a cooperating clamp portion at the end of each leg resiliently held in contact with the clamp portion of the mating leg; and a tab adjacent the end of each leg extending spacedly to the rear of the mating leg; whereby pressural contact on a cooperating pair of tabs will cause separation of their respective clamp portions.

2. A reel for a coil of filamentary material comprising: a pair of dished plates of resilient material having their concave surfaces facing each other; means to hold the center portions of said plates substantially in contact with each other; a plurality of legs extending radially outwardly of each plate, the legs of one plate overlying the legs of the other plate; the free end of each leg being reversely curved to provide a clamp portion cooperating with a similar portion of the mating leg; and a tab integral with each leg and extending from a side edge thereof toward and beyond the mating leg and thence behind said mating leg and spaced therefrom; whereby movement of a pair of cooperating tabs toward each other will cause separation of their respective clamp portions and contact of said tabs with said mating legs will limit the extent of said separation.

3. A reel for a coil of filamentary material comprising: a pair of plates of resilient material; means to hold the center portions of said plates substantially in contact with each other; a plurality of legs extending radially outwardly of each plate, the legs of one plate overlying the legs of the other plate; a cooperating clamp portion at the end of each leg resiliently held in contact with the clamp portion of the mating leg; and means integral with each leg adapted to be pressed toward each other to cause separation of their respective clamp portions.

BENJAMIN R. WEBSTER.

REFERENCES CITED

The following references are of record in the file of this patent:

UNITED STATES PATENTS

| Number | Name | Date |
| --- | --- | --- |
| 1,489,591 | Catlett et al. | Apr. 8, 1924 |
| 1,516,331 | Catlett et al. | Nov. 18, 1924 |
| 2,092,522 | Post | Sept. 7, 1937 |
| 2,364,262 | Wehringer | Dec. 5 1944 |